US008057307B2

(12) United States Patent
Berstis et al.

(10) Patent No.: US 8,057,307 B2
(45) Date of Patent: Nov. 15, 2011

(54) HANDLING OF PLAYERS AND OBJECTS IN MASSIVE MULTI-PLAYER ON-LINE GAMES

(75) Inventors: Viktors Berstis, Austin, TX (US); John Daniel Sieron Bethencourt, Mt. Horeb, WI (US); Kevin Blake Damm, Sanford, NC (US); Robert Glenn Deen, San Jose, CA (US); Matthew Arthur Hammer, Stoughton, WI (US); James H. Kaufman, San Jose, CA (US); Tobin Jon Lehman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 11/089,389

(22) Filed: Mar. 24, 2005

(65) Prior Publication Data

US 2006/0217201 A1 Sep. 28, 2006

Related U.S. Application Data

(63) Continuation-in-part of application No. 10/821,050, filed on Apr. 8, 2004, now Pat. No. 7,428,588.

(51) Int. Cl.
*A63F 13/00* (2006.01)

(52) U.S. Cl. ............. 463/42; 463/31; 455/453; 718/105

(58) Field of Classification Search .................... 463/31, 463/40–42; 709/205, 315, 229; 455/453; 718/105
See application file for complete search history.

(56) References Cited

U.S. PATENT DOCUMENTS 5,031,089 A 7/1991 Liu et al.
5,442,569 A 8/1995 Osano
5,539,883 A 7/1996 Allon et al.
5,630,129 A 5/1997 Wheat
5,736,990 A 4/1998 Barrus et al. .................. 345/433
5,774,668 A 6/1998 Choquier et al.
5,860,137 A 1/1999 Raz et al.
5,938,722 A 8/1999 Johnson
6,008,848 A 12/1999 Tiwari et al.
6,009,455 A 12/1999 Doyle
6,021,268 A 2/2000 Johnson (Continued)

FOREIGN PATENT DOCUMENTS

JP 11-191097 4/1999
JP 11-191097 7/1999

OTHER PUBLICATIONS

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber=1266179&isnumber=28322http://ieeexplore.ieee.org/xpl/absprintf.jsp?arnumber=1266179.*

(Continued)

*Primary Examiner* — Ronald Laneau
*Assistant Examiner* — Ross A Williams
(74) *Attorney, Agent, or Firm* — Suiter Swantz pc llo

(57) ABSTRACT

The disclosed massive multi-player on-line gaming environment and method eliminate the coordination and synchronization problems between servers by assigning each game user to a specific client proxy server for game duration and utilizing a space information distribution center to indicate client specific changes in game space. Such configuration eliminates the need to use "grey" areas around partitioning boundaries and servers having to "own" client objects thereby improving massive multi-player on-line gaming scalability.

23 Claims, 6 Drawing Sheets

U.S. PATENT DOCUMENTS

| | | | | |
|---|---|---|---|---|
| 6,049,819 | A | 4/2000 | Buckle et al. | |
| 6,058,266 | A | 5/2000 | Megiddo et al. | |
| 6,088,727 | A | 7/2000 | Hosokawa et al. | |
| 6,101,538 | A | 8/2000 | Brown | |
| 6,141,699 | A | 10/2000 | Luzzi et al. | |
| 6,308,208 | B1 | 10/2001 | Jung et al. | |
| 6,314,465 | B1 | 11/2001 | Paul et al. | |
| 6,330,281 | B1 | 12/2001 | Mann et al. | 375/240.12 |
| 6,345,287 | B1 | 2/2002 | Fong et al. | |
| 6,349,091 | B1 | 2/2002 | Li | |
| 6,351,775 | B1 | 2/2002 | Yu | |
| 6,370,560 | B1 | 4/2002 | Robertazzi et al. | |
| 6,418,462 | B1 | 7/2002 | Xu | |
| 6,473,597 | B1 | 10/2002 | Johnson | |
| 6,539,415 | B1 | 3/2003 | Mercs | |
| 6,574,477 | B1 | 6/2003 | Rathunde | |
| 6,580,981 | B1 | 6/2003 | Masood et al. | |
| 6,601,084 | B1 | 7/2003 | Bhaskaran et al. | |
| 6,801,930 | B1 * | 10/2004 | Dionne et al. | 709/205 |
| 6,941,236 | B2 | 9/2005 | Huelsbergen et al. | |
| 6,970,929 | B2 | 11/2005 | Bae et al. | |
| 7,089,266 | B2 | 8/2006 | Stolte et al. | |
| 7,124,071 | B2 | 10/2006 | Rich et al. | |
| 7,139,792 | B1 | 11/2006 | Mishra et al. | |
| 7,159,217 | B2 | 1/2007 | Pulsipher et al. | |
| 7,185,067 | B1 | 2/2007 | Viswanath et al. | |
| 7,353,295 | B1 | 4/2008 | Crow et al. | |
| 7,428,588 | B2 | 9/2008 | Berstis | |
| 7,467,180 | B2 | 12/2008 | Kaufman | |
| 7,590,984 | B2 | 9/2009 | Kaufman | |
| 7,702,784 | B2 | 4/2010 | Berstis | |
| 2002/0065870 | A1 | 5/2002 | Baehr-Jones et al. | |
| 2002/0124137 | A1 | 9/2002 | Ulrich et al. | |
| 2003/0008712 | A1 | 1/2003 | Poulin | |
| 2003/0055892 | A1 | 3/2003 | Huitema et al. | |
| 2003/0056002 | A1 | 3/2003 | Trethewey | |
| 2003/0135621 | A1 | 7/2003 | Romagnoli | |
| 2003/0177187 | A1 * | 9/2003 | Levine et al. | 709/205 |
| 2004/0103079 | A1 | 5/2004 | Tokusho et al. | |
| 2004/0210627 | A1 | 10/2004 | Kroening | |
| 2004/0244006 | A1 | 12/2004 | Kaufman et al. | |
| 2005/0015571 | A1 | 1/2005 | Kaufman | |
| 2005/0246711 | A1 | 11/2005 | Berstis et al. | |
| 2008/0270605 | A1 | 10/2008 | Berstis et al. | |
| 2008/0301405 | A1 | 12/2008 | Kaufman | |

OTHER PUBLICATIONS

"A multi-server architecture for distributed virtual walkthrough" http://delivery.acm.org/10.1145/590000/585768/p163-ng.pdf?key1=585768&key2=0554824911&coll=GUIDE&dl=GUIDE&CFID=41712537&CFTOKEN=50783297.*

Newtons Telecom Dictionary, Proxy server definition, Published 1998, p. 552.*

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.*

IBM developer Works, OptimalGrid—autonomic computing on the Grid, James H. Kaufman; Tobin J. Lehman; Glenn Deen; and John Thomas, Jun. 2003.

IBM, Transcoding: Entending e-business to new environments, Britton et al., Sep. 22, 2000.

Lee et al., "A Self-Adjusting Data Distribution Mechanism for Multidimensional Load Balancing in Multiprocessor-Based Database Systems," Information Systems vol. 19, No. 7, pp. 549-567, 1994.

Ma et al., "A Scalable Parallel Cell-Projection Volume Rendering Algorithm for Three-Dimensional Unstructured Data," IEEE 1997, pp. 1-10.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

Hassen et al., "A Task-and-Data-Parallel Programming Language Based on Shared Objects," ACM Transactions on Programming Languages and Systems, vol. 20, No. 6, Nov. 1998, pp. 1131-1170.

Mauve, 2002. "A generic proxy system for networked computer games." In Proceedings of the 1st Workshop on Network and System Support for Games (Braunschweig, Germany, Apr. 16-17, 2002). NetGames '02. pp. 1-4, ACM, New York, NY, 25-28. 001=http://doi.acm.org/10.1145/566500.566504.

Andert, "A Simulation of Dynamic Task Allocation in a Distributed Computer System," Proceedings of the 1987 Winter Simulation Conference, 1987, pp. 1-9.

"User Interface for a Parallel File System," IBM Technical Disclosure Bulletin, vol. 37, No. 11, Nov. 1994, pp. 477-480.

"A Data Modeling Technique Used to Model Data Used in Task Analysis," Research Disclosure—Mar. 1998/297, 1 page.

Kaufman et al., "The Almaden SmartGrid project Autonomous optimization of distributed computing on the Grid," IEEE TFCC Newsletter, vol. 4, No. 2, Mar. 2003, pp. 1-21.

Ng, et al., "A multi-server architecture for distributed virtual Walkthrough" ACM VRST'02, Nov. 2002 Hong Kong, pp. 163-170.

Duong et al., "A dynamic load sharing algorithm for mass/vely multiplayer online games" published Sep. 28, 2003-Oct. 1, 2003. pp. 131-136 http://ieeexplore.ieee.org/ie15/8945/28322/01266179.pdf?tp=&arnumber=1266179&isnumber=28322http://ieeexplore.ieee.org/xpi/absprintf.jsp?arnumber=1266179.

Notice of Allowance dated Jul. 22, 2008 for U.S. Appl. No. 10/448,949, now U.S. Patent No. 7,467,180.

Non-Final Office Action dated Mar. 25, 2011, for U.S. Appl. No. 12/191,483.

Non-Final Office Action dated Jan. 29, 2007, for U.S. Appl. No. 10/448,625, now U.S. Patent No. 7,590,984.

Final Office Action dated Nov. 9, 2007, for U.S. Appl. No. 10/448,625, now U.S. Patent No. 7,590,984.

Non-Final Office Action dated May 23, 2008, for U.S. Appl. No. 10/448,625, now U.S. Patent No. 7,590,984.

Final Office Action dated Nov. 24, 2008, for U.S. Appl. No. 10/448,625, now U.S. Patent No. 7,590,984.

Notice of Allowance dated May 8, 2009, for U.S. Appl. No. 10/448,625, now U.S. Patent No. 7,590,984.

Notice of Allowance dated May 19, 2008, for U.S. Appl. No. 10/821,050, now U.S. Patent No. 7,428,588.

Non-Final Office Action dated Sep. 21, 2009, for U.S. Appl. No. 12/172,473, now U.S. Patent No. 7,702,784.

Notice of Allowance dated Dec. 3, 2009, for U.S. Appl. No. 12/172,473, now U.S. Patent No. 7,702,784.

Advisory Action dated Feb. 2, 2009, for U.S. Appl. No. 10/448,625, now U.S. Patent No. 7,590,984.

* cited by examiner

HANDLING OF PLAYERS AND OBJECTS IN MASSIVE MULTI-PLAYER ON-LINE GAMES

CROSS REFERENCE TO RELATED APPLICATIONS

The present invention is a continuation-in-part of U.S. application Ser. No. 10/821,050, "Method for Distributing and Geographically Load Balancing Location Aware Communication Device Client-Proxy Applications" filed on Apr. 8, 2004. The U.S. application Ser. Nos. 10,821,050, 10/448,949, "Automatically Segmenting and Populating a Distributed Computing Problem" filed on May 29, 2003, and Ser. No. 10/448,625, "System and Method for Balancing a Computing Load Among Computing Resources in a Distributed Computing Problem" filed on May 29, 2003, which are assigned to the same assignee, are herein incorporated by reference in their entireties.

FIELD OF THE INVENTION

The present invention generally relates to the field of massive multi-player on-line computer gaming, and more specifically, to a system and method for partitioning work between servers and tracking client interaction with servers in multi-player games running on multiple servers.

BACKGROUND OF THE INVENTION

With the proliferation of the Internet and technology, massive multi-player on-line games have become increasingly popular. There are a number of common features shared by massive multi-player on-line games which distinguish them from other types of on-line computer games. First, most massive multi-player on-line games host a number of players in a single game world where all those players can interact at one time. For instance, a popular massive multi-player might host thousands of players online at any given time. Second, to support all those players, massive multi-player on-line games employ large-scale game worlds. As such, large areas of the game are interconnected within the game such that players may traverse great distances without having to switch servers manually. Further, multi-player on-line games require updated data for each user location and application that a user may call upon during game play. As the number of players increases, the complexity of calculations and server demand increases. Finally, the game state in massive multi-player on-line games rarely resets.

There are two conventional approaches taken to distribute the handling of players and objects in game space. One is to simply partition the game world using special tunnels, small single person passageways, or other contrivances at the boundaries between servers. This approach is limited in that the partitioning is static. Thus, if too many players converge on the same server's portion of the game world, that server will become overloaded and game performance will suffer.

The second approach is the setting of dynamic boundaries. Although the setting of dynamic boundaries limits server overload, with this approach, there are many places in the game space where players can simultaneously see into one or more other servers' area of control. Thus, the servers need to tightly synchronize information with their neighboring servers. Furthermore, in these configurations, a "grey" area is present around the partitioning boundaries where both servers partially "own" the objects, the data is mirrored between the servers, all in an attempt to reduce the work involved in handing off an object to the next server when the object leaves the "grey" area. This mirroring, though, further increases synchronization problems and greatly complicates the server code. These techniques are described in detail in "Massively Multi-player Game Development" edited by Thor Alexander in 2003 (ISBN 1-58450-243-6). As stated in "Massively Multi-player Game Development," although many limitations are associated with such techniques, implementation is necessary in order to achieve desired massive multi-player on-line game scalability.

Therefore, it would be desirable to develop a massive multi-player on-line game with technology designed to overcome the above mentioned difficult coordination and synchronization problems between multiple servers thereby improving on-line gaming.

SUMMARY OF THE INVENTION

Accordingly, the present invention is a system and a method directed to an improved handling of players and objects in massive multi-player on-line games. The disclosed massive multi-player on-line game system and method may eliminate the coordination and synchronization problems between servers by assigning each game user (client) to a specific client proxy server for game duration and utilizing a space information distribution center to indicate client specific changes in game space. Such configuration eliminates the need to use "grey" areas around partitioning boundaries and servers having to "own" client objects thereby improving massive multi-player on-line gaming scalability.

In accordance with a first aspect of the present invention, a massive multi-player on-line gaming environment is disclosed. In an exemplary embodiment, the environment includes a space information distribution system and a game space mapping system connected via an internal network. Further, a plurality of client proxy servers is connected to the internal network. A multiplicity of remote users is connected to the client proxy servers via a worldwide network. Each client proxy server handles one or more users for game duration, wherein the client proxy servers employ the information from the game space mapping system and space information distribution system to distribute only the needed information to each specific user.

In accordance with a second aspect of the present invention, a method for partitioning work-load between servers and tracking user interaction with servers in multi-player games running multiple servers is disclosed. In an exemplary embodiment, the method includes the following steps: (1) creating an internal network that includes a space information distribution system and a game space mapping system; (2) assigning each remote game user to a client proxy server, each client proxy server handling one or more users for the duration of the multi-player game and connecting the client proxy servers to the internal network; and (3) employing the space information distribution system to track user status information, the space information distribution system sending the information to the client proxy servers to distribute user specific information to appropriate remote users via a worldwide network.

In accordance with a third aspect of the present invention, a method for partitioning work-load between servers and tracking user interaction with servers in massive multi-player online games running multiple servers is disclosed, comprising the steps of: (1) segmenting game space within a multi-player game into a game graph with vertices and edges, the vertices representing game regions and the edges connecting the game regions that can influence each other; (2) assigning each game user to a client proxy server, the client proxy server handling one or more users for the duration of the multi-player game; (3) employing a space information distribution system to track user status information; (4) delegating communications between the client proxy servers and the space information distribution system; and (5) sending the information of the space information distribution system to the client proxy servers, the client proxy servers then employing the information to distribute user specific information to game users connected to the client proxy servers via a worldwide network.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
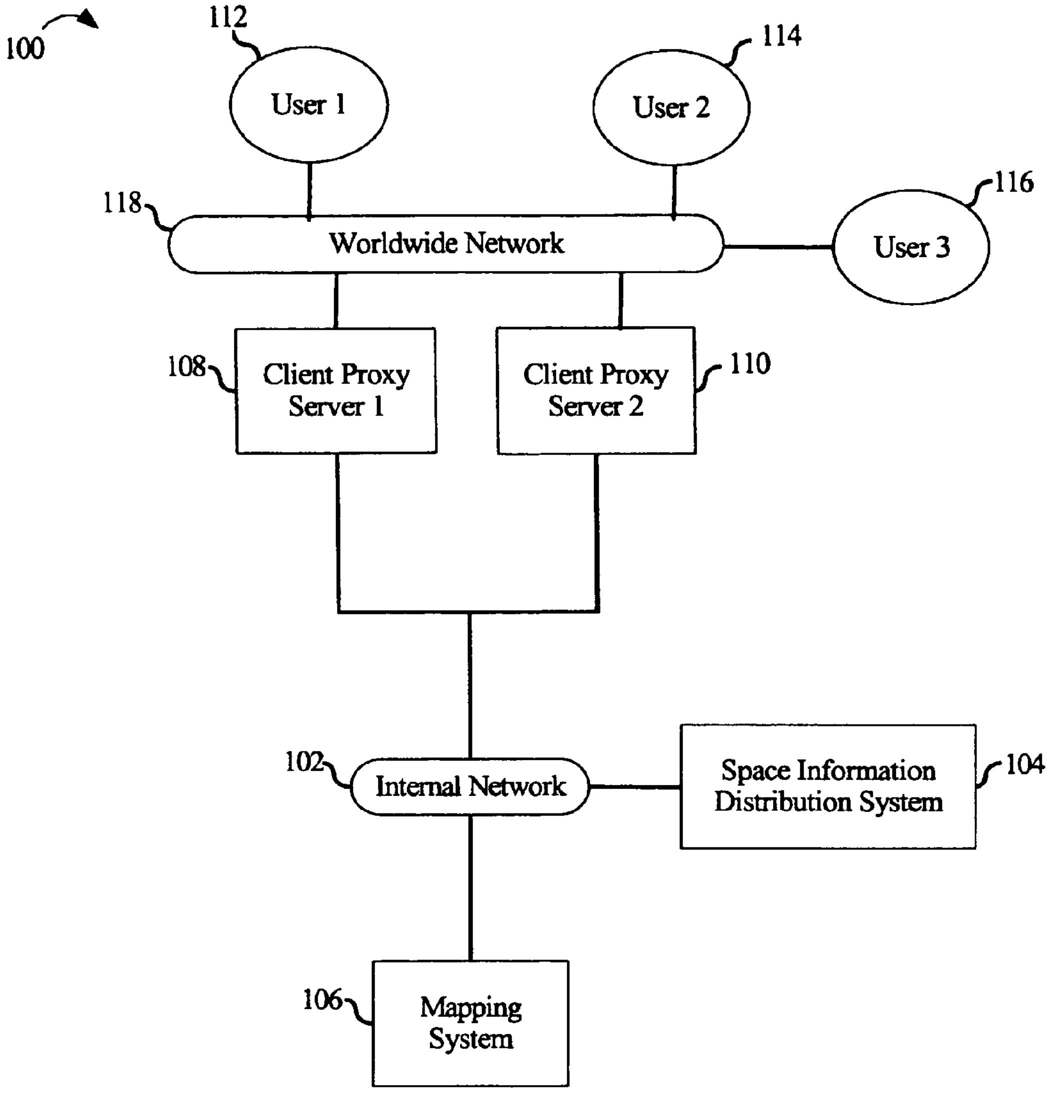
FIG. 1 is an illustration of a massive multi-player on-line gaming environment in accordance with an exemplary embodiment of the present invention.

FIG. 1 depicts massive multi-player on-line gaming environment 100, which is shown by way of example and not by way of limitation. The massive multi-player on-line gaming environment 100 comprises a space information distribution system 104 and a game space mapping system connected via a worldwide network. Further, a plurality of client proxy servers, (i.e. client proxy server 1, 108, and client proxy server 2, 110) is connected to the internal network 102. A multiplicity of remote users (i.e. user 1, 112; user 2, 114; and user 3, 116) is connected to the client proxy servers via a worldwide network 118. One example of a worldwide network is the Internet. Each client proxy server handles one or more users for game duration, wherein the client proxy servers employ the information from the game space mapping system 106 and space information distribution system 104 to distribute only the needed information to each specific user.

Figure 2:
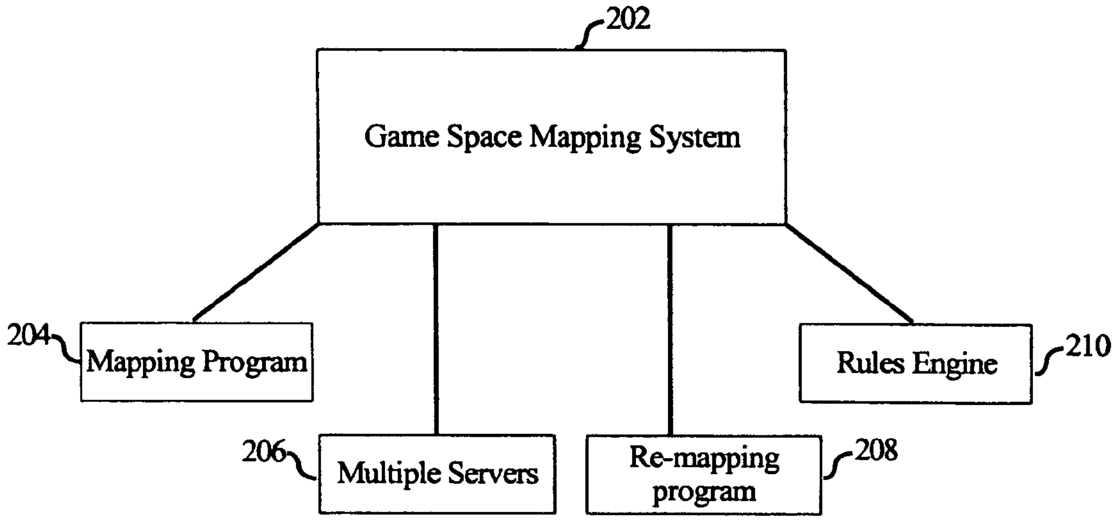
FIG. 2 is an illustration of a game space mapping system in accordance with an exemplary embodiment of the present invention.

Referring to FIG. 2, the game space mapping system 202 is comprised of a game space mapping program 204, multiple servers 206 to process the graph of game space, re-mapping game space program 208, and rules engine 210. The game space mapping program 204 creates a graph of game space with vertices (nodes) representing specific game regions and edges connecting those game regions capable of being influenced.

Figure 3A:
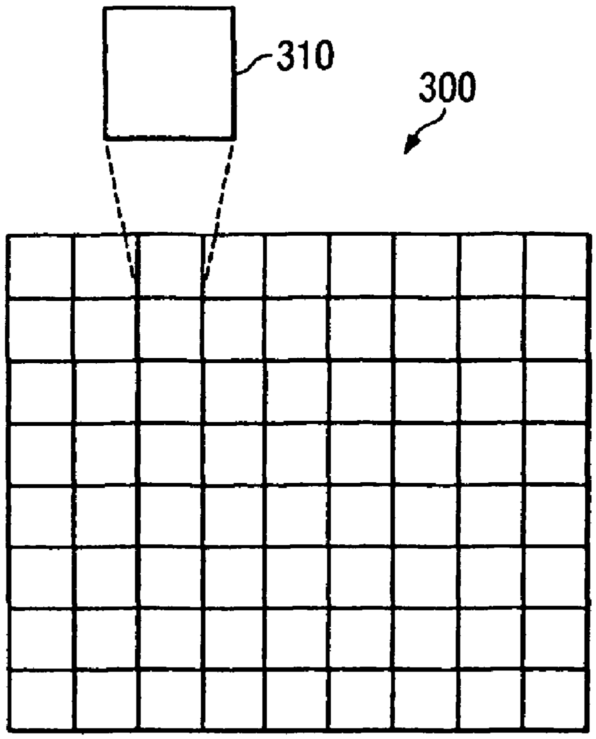
FIG. 3A is an illustration of a cell and collection of cells.

As illustrated in FIG. 3A, a cell 310 may represent a node on the game space graph, and may contain data, methods, and pointers to other cells. Cell 310 is grouped within collection 300. In some situations, a collection could consist of only one cell. Each grid node handles one or more collections at a time whereby the collections are dynamically assigned to a partition for execution on a common grid node.

Figure 3B:
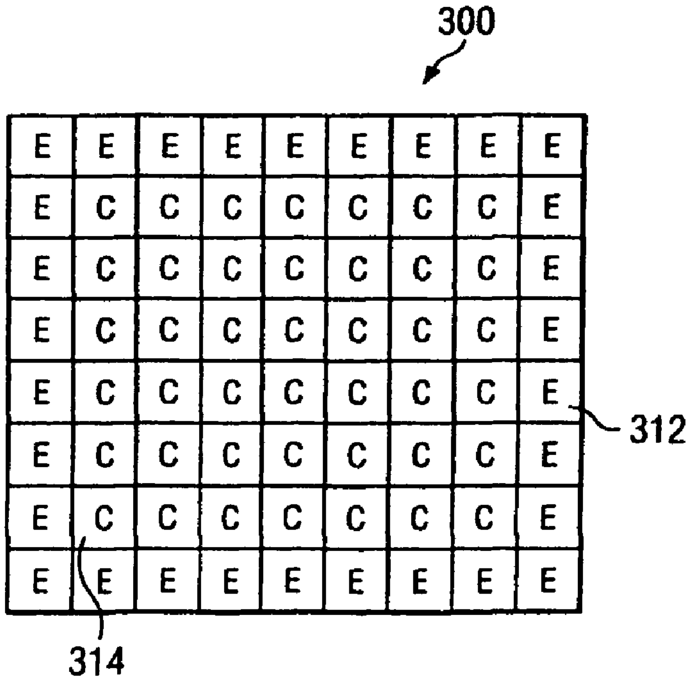
FIG. 3B is an illustration of a collection of cells, core cells and edge cells.

FIG. 3B shows cells marked with an E or C. Cells marked with an E are edge cells. Cells marked with a C are core cells. The cells within a collection (i.e. the core cells, 314, and the edge cells, 312) communicate with one another directly using in-memory communication such as Java object references. The edge cells will communicate with the edge of neighboring collections using in-memory communication if they are on the same partition. If the collections are not within the same partition, then data is transmitted over the existing network infrastructure. For example, copies of entire objects (i.e. the cells themselves) can be sent from the edge cells of one collection to the edge cells of another collection. Thus, when a cell communicates with a neighboring cell, the cell has access to the code or processes used by the neighboring cell. Since the transmitted objects have data, methods, and pointers to neighboring cells, the communicating cell will also know the neighboring cells of its neighboring cells. The mapping program follows rules to minimize the amount of network communication required. Therefore, the cells, collections, and partitions together form the foundation of the game space mapping system.

The rules engine 210 decides whether the game space graph is to be altered. Alteration of the game space graph may be necessary in order to balance server load when activity concentrates in one game space region i.e. an area of a game map where a large number of players have converged. To prevent server over-load, upon receipt of an instruction from the space information distribution system 104 of FIG. 1, re-mapping game space program 208 determines the applicable rules engine 210, and applies such engine to re-calculate the game space graph. Re-mapping game space program 208 configures partitions to remove load from an over-loaded server (or servers) and to adjust data communication requirements accordingly. The re-mapping program 208 adjusts the load by re-assigning cells from a server operating above threshold to a neighboring server that is not above threshold. As such, re-mapping program 208 creates a new game space graph that includes a smaller geographic area being assigned to a specific server thereby reducing the number of game players processed by that server. New communication dependencies, based upon the new assignment, are also reflected in the new game space graph. The reconfiguration of partitions and adjustment of communication requirements is performed according to instructions from rules engine 210.

The game map system 202 assigns partitions to servers 206, and servers 206 perform the actual computations for the partitions of the game space graph. Multiple servers 206 only send one message to the separate space information distribution system 104 to indicate what is changing in their own part of the game space. The space information distribution system 104 transmits such information to the various client proxy servers, such client proxy server 1, 108 and client proxy server 2, 110, which, in turn, only send the needed information to each user.

Figure 4:
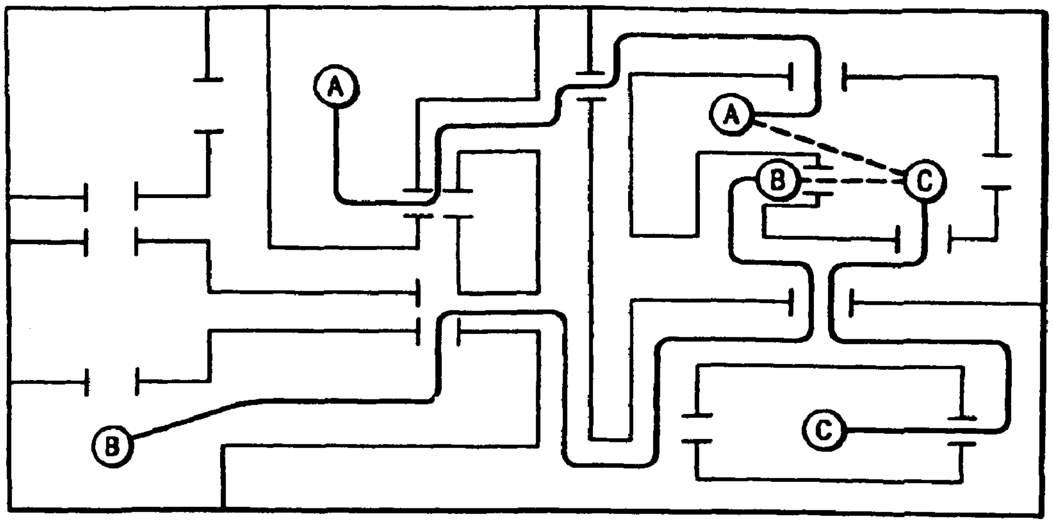
FIG. 4 is an example of game scenario when users of a massive multi-player on-line game change position.

Referring now to FIG. 4, a game scenario in which three users converge in one region of game space is provided. As shown, users A, B, and C initially begin in areas where they do not have visual contact with each other in the virtual world map. But after users A, B and C move into the upper right corner of the virtual world map, users A and C are in virtual line of sight with each other and users B and C are in virtual line of sight with each other. Depending on the game type, users A, B and C may call upon the application they are participating in to perform various actions. As the number of users increases in one region of game space, the server demand and number of calculations called upon to be made within that particular region increases. In accordance with the present invention, such scenario is monitored by the space information distribution system and, in turn, by the game space mapping system. If number of users increased above desired threshold, the rules engine within the game space mapping system would re-calculate the game space graph to shift the work-load of the over-burdened server to an un-burdened neighboring server.

Figure 5:
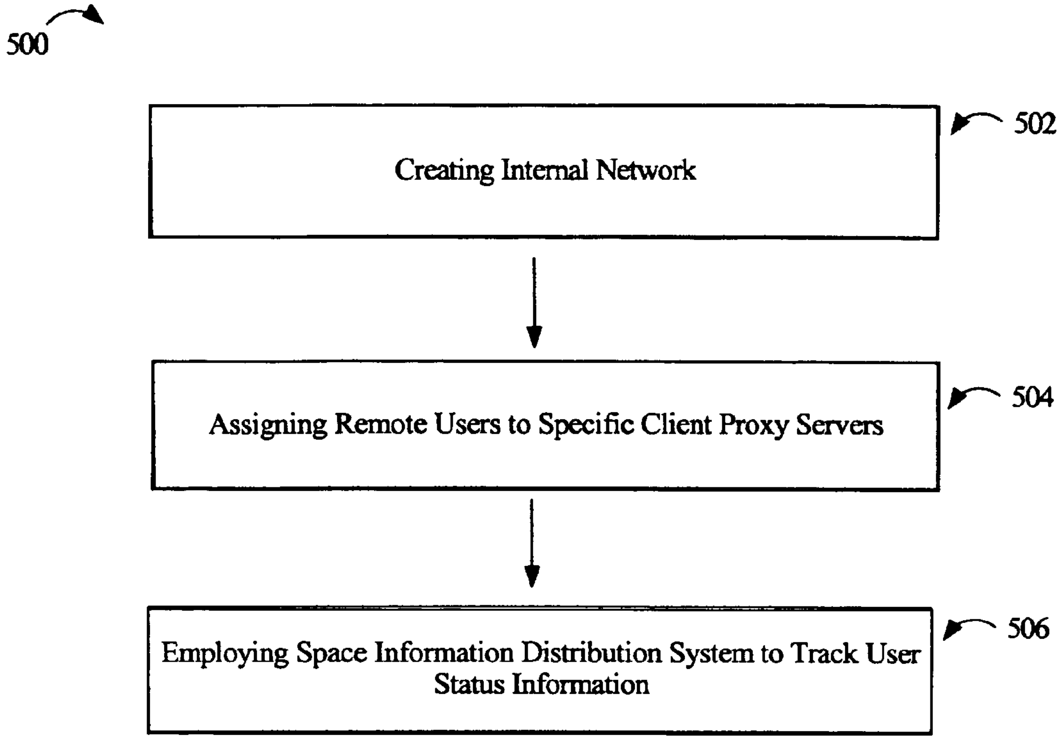
FIG. 5 is a flow diagram illustrating an additional method for partitioning work between servers and tracking user interaction with servers in multi-player games running multiple servers in accordance with the present invention.

Referring now to FIG. 5, a method for partitioning work between servers and tracking user interaction with servers in massive multi-player games running multiple servers is disclosed. In an exemplary embodiment, the method 500 includes the following steps: (1) creating an internal network 502 that includes a space information distribution system, a game space mapping system, and a plurality of applications and servers; (2) assigning each remote game user to a client proxy server 504, each client proxy server handling one or more users for the duration of the multi-player game and connecting the client proxy servers to the internal network; and (3) employing the space information distribution system to track user status information 506, the space information distribution system sending the information to the client proxy servers to distribute user specific information to the remote users via a worldwide network.

Additionally, method 500 for partitioning work between servers and tracking user interaction with servers in massive multi-player games running multiple servers disclosed in FIG. 5, includes a game space mapping program, multiple servers to process the graph of game space, a re-mapping game space program, and a rules engine to re-calculate the game space graph. In such embodiment, the game space mapping system includes the following steps: (1) creating a game space graph with vertices representing specific game regions and edges connecting the game regions capable of being influenced; (2) assigning partitions to the plurality of servers; (3) the servers performing computations for the partitioning of the game space graph, and then sending one message to the space information distribution system to indicate changes in their own part of the game space; and (4) the space information distribution system transmitting the message from the plurality of servers within the game space mapping system to the various client proxy servers. Additionally, in embodiments of the invention, the re-mapping game space program determines the applicable rule engine and applies such engine to re-calculate the game space graph.

Figure 6:
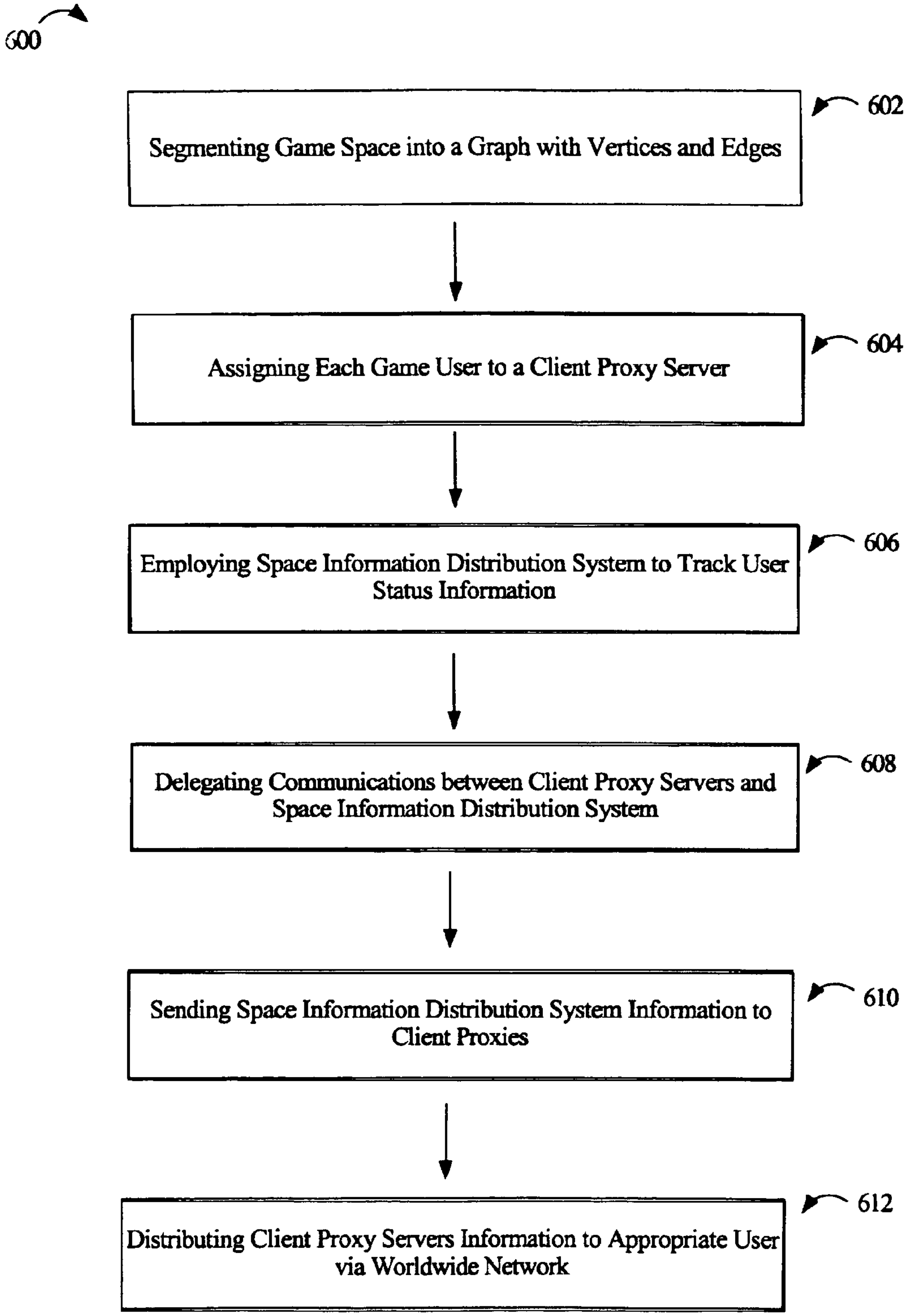
FIG. 6 is a flow diagram illustrating an additional method for partitioning work between servers and tracking user interaction with servers in multi-player games running multiple servers in accordance with the present invention.

Referring now to FIG. 6, an additional embodiment of a method 600 for partitioning work between servers and tracking user interaction with servers in massive multi-player online games running multiple servers is disclosed. The method 600 is comprised of the following steps: (1) segmenting game space within a multi-player game into a game graph with vertices and edges 602, the vertices representing game regions and the edges connecting the game regions that can influence each other; (2) assigning each game user to a client proxy server 604, the client proxy server handling one or more users for the duration of the multi-player game; (3) employing a space information distribution system to track user status information 606; (4) delegating communications between the client proxy servers and the space information distribution system 608; (5) sending the information of the space information distribution system to the client proxy servers 610; and the client proxy servers then employing the information to distribute user specific information to game users connected to the client proxy servers via a worldwide network 612. It is contemplated that such method could be utilized to convert an existing computer game into a massive multi-player on-line game.

It is believed that the present invention and many of its attendant advantages will be understood by the foregoing description. It is also believed that it will be apparent that various changes may be made in size, materials, shape, form, function, manner of operation, assembly and use of the components thereof without departing from the scope and spirit of the invention or without sacrificing all of its material advantages. The form herein before described being merely an explanatory embodiment thereof. Further, it is contemplated that the specific order or hierarchy of steps in the method can be rearranged while remaining within the scope and spirit of the present invention. It is the intention of the following claims to encompass and include such changes.

What is claimed is:

1. A massive multi-player on-line gaming environment, comprising:

a space information distribution system;

a game space mapping system, connected to the space information distribution system via an internal network, comprising:

a game space mapping program comprising a graph of game space;

a plurality of servers to process the graph of game space, each server of the plurality of servers sending a message to the space information distribution system to indicate a change in their own part of the game space;

a re-mapping game space program; and a rules engine to re-calculate the game space graph;

a plurality of client proxy servers connected to the internal network; and a multiplicity of remote users connected to the client proxy servers by a worldwide network, each of the plurality of client proxy servers handling one or more users for game duration wherein the one or more users handled by a client proxy server are not handed off to another client proxy server to be handled, wherein the space information distribution system tracks user status information for the multiplicity of remote users, the space information distribution system sends changes in the game space received from the plurality of servers to the plurality of client proxy servers, and the plurality of client proxy servers employ information from the game space mapping system and space information distribution system to distribute only user specific information to each specific remote user.

2. The massive multi-player on-line gaming environment of claim 1 wherein the graph of game space includes vertices representing specific game regions and edges connecting those game regions capable of being influenced.

3. The massive multi-player on-line gaming environment of claim 2 wherein the game space mapping system further comprises means for assigning partitions to the plurality of servers, the servers performing computations for the partitioning of the game space graph.

4. The massive multi-player on-line gaming environment of claim 3 wherein the partitions comprise one or more collections of one or more cells wherein communication among cells within a collection is performed by in-memory communication, communication among cells not within a collection is performed by in-memory communication when the cells are within the same partition, and communication among cells not within a collection is performed over a network connecting the plurality of servers when the cells are not within the same partition.

5. The massive multi-player on-line gaming environment of claim 1 wherein the space information distribution system is comprised of a communication program, a communication game space graph, a game space map address book, and a game space user address book.

6. The massive multi-player on-line gaming environment of claim 5 wherein the communication program is further comprised of means to monitor data in the communication graph.

7. The massive multi-player on-line gaming environment of claim 6 wherein the communication program further comprises means for calculating a threshold for server load and comparing said value to a pre-established threshold.

8. The massive multi-player on-line gaming environment of claim 7 wherein the communication program further comprises means for sending an instruction to the re-mapping program to alter the game space graph when the calculated threshold is greater than the pre-established threshold.

9. The massive multi-player on-line gaming environment of claim 1 wherein the re-mapping game space program further comprises a means for determining the applicable rule engine and applying such engine to re-calculate the game space graph.

10. The massive multi-player on-line gaming environment of claim 9 wherein the re-mapping game space program further comprises a means for determining the applicable rule engine and applying such engine to re-calculate the game space graph.

11. A method for partitioning work between servers and tracking user interaction with servers in massive multi-player online games running multiple servers, comprising:

creating an internal network that includes a space information distribution system, a game space mapping system including a plurality of servers to process a graph of game space, each server of the plurality of servers sending a message to the space information distribution system indicating a change in their own part of the game space, and a plurality of applications and servers;

assigning each remote game user to one of a plurality of client proxy servers, each client proxy server handling one or more users for the duration of the multi-player game wherein the one or more users handled by a client proxy server are not handed off to another client proxy server to be handled;

connecting the client proxy servers to the internal network; and employing the space information distribution system to track user status information, the space information distribution system sending the information indicating a change in game space sent by the plurality of servers to the plurality of client proxy servers to distribute user specific information to the remote users via a worldwide network.

12. The method of claim 11 wherein the game space mapping system further includes a game space mapping program, a re-mapping game space program, and a rules engine to re-calculate the game space graph.

13. The method of claim 12 wherein the game space mapping system further includes a game space graph with vertices representing specific game regions and edges connecting the game regions capable of being influenced.

14. The method of claim 12 wherein the game space mapping system assigning partitions to the plurality of servers, the servers performing computations for the partitioning of the game space graph.

15. The method of claim 14 wherein the partitions comprise one or more collections of one or more cells wherein communication among cells within a collection is performed by in-memory communication, communication among cells not within a collection is performed by in-memory communication when the cells are within the same partition, and communication among cells not within a collection is performed over a network connecting the plurality of servers when the cells are not within the same partition.

16. The method of claim 13 used to convert an existing computer game into a massive multi-player on-line game.

17. The method of claim 11 wherein the space information distribution system includes a communication program, a communication game space graph, a game space map address book, and a game space user address.

18. The method of claim 17 wherein the space information distribution system monitors data in the communication game space graph.

19. The method of claim 18 wherein the space information distribution system is capable of calculating a threshold for server load and comparing said value to a pre-established threshold.

20. The method of claim 19 wherein the communication program sends an instruction to the re-mapping program to alter the game space graph when the calculated threshold is greater than the pre-established threshold.

21. The method of claim 20 wherein the re-mapping program determines the applicable rule engine and applies such engine to re-calculate the game space graph.

22. A method for partitioning work between servers and tracking user interaction with servers in massive multi-player online games running multiple servers, comprising the steps of:

segmenting game space within a multi-player game into a game graph with vertices and edges, the vertices representing game regions and the edges connecting the game regions that can influence each other;

assigning each game user to one of a plurality of client proxy servers, each of the plurality of client proxy servers handling one or more users for the duration of the multi-player game wherein the one or more users handled by a client proxy server are not handed off to another client proxy server to be handled;

employing a space information distribution system to track user status information;

processing the game graph utilizing a game space mapping system which utilizes a plurality of servers to process the game graph, each of the plurality of servers sending a message to the space information distribution system to indicate a change in their own part of the game space;

delegating communications between the client proxy servers and the space information distribution system; and sending the information of the space information distribution system indicating a change in game space received from the plurality of servers to the plurality of client proxy servers, the plurality of client proxy servers then employing the information to distribute user specific information to game users connected to the plurality of client proxy servers via a worldwide network.

23. The method of claim 22 used to convert an existing computer game into a massive multi-player on-line game.

* * * * *